United States Patent [19]
Kurz et al.

[11] 4,071,369
[45] Jan. 31, 1978

[54] METHOD OF MANUFACTURING POROUS CERAMIC PRODUCTS BY REACTING FLUE GAS DUST AND FILTER DUST WITH CLAYS OR THE LIKE, SUCH AS EXPANDED CLAY

[76] Inventors: Fredrik Wilhelm Kurz, Nysatravagen 12, Lidingo; Hans Rudmark, Robo, Uppsala, both of Sweden

[21] Appl. No.: 740,931

[22] Filed: Nov. 11, 1976

Related U.S. Application Data

[63] Continuation of Ser. No. 588,053, June 18, 1975, abandoned, which is a continuation-in-part of Ser. No. 235,079, March 15, 1972, abandoned.

[30] Foreign Application Priority Data

Mar. 19, 1971 Sweden .................. 3620/71

[51] Int. Cl.$^2$ .................................. C04B 21/00
[52] U.S. Cl. ...................... 106/40 R; 106/40 V; 106/41; 106/68; 106/71; 106/73.6; 106/288 B; 106/DIG. 1; 264/43; 264/44
[58] Field of Search .............. 106/40 R, 41, 73.6, 106/71, 68, DIG. 1, 288 B; 264/43, 44, 65

[56] References Cited

U.S. PATENT DOCUMENTS

| 2,699,409 | 1/1955 | Hashimoto | 106/40 R |
| 2,833,659 | 5/1958 | Bauer | 106/71 |
| 2,839,415 | 6/1958 | Gemeiner | 106/71 |
| 2,970,060 | 1/1961 | Burnett | 106/71 |

FOREIGN PATENT DOCUMENTS 1,227,482  4/1971  United Kingdom .............. 106/40 V

OTHER PUBLICATIONS

Dziob et al., "Utility of Z. Clay, Electrofilter Dusts From Turow Power Plant and Kaolin Residues as Raw Materials for Production of Wall Tiles" (Zeszyty, Nauk. Akad.) Ceramika, 1971, No. 17, pp. 97–104 (Polish), Mar. 1971.
Bureau of Mines Info. Circ. No. 8483, "Fly Ash Utilization" (1970), p. 14, pp. 53–55.

Primary Examiner—Helen M. McCarthy
Attorney, Agent, or Firm—Stevens, Davis, Miller & Mosher

[57] ABSTRACT

A method for manufacturing porous ceramic products by mixing ceramic material with a fly dust containing silica and metal oxides and having a large specific surface area of at least 20 m$^2$/g. The mixture is heated to at least 800° C to convert it into a porous ceramic material. The process is carried out so as to result in either products having mainly closed pores by heating at sintering temperatures or products having mainly open pores by heating at consolidation temperatures. The admixture may be wrapped in a sheet of material which upon heating the admixture to form pores in the material encloses the gases formed at low temperatures but which ruptures at high temperatures to expose the clay to an oxidizing atmosphere.

3 Claims, No Drawings

METHOD OF MANUFACTURING POROUS CERAMIC PRODUCTS BY REACTING FLUE GAS DUST AND FILTER DUST WITH CLAYS OR THE LIKE, SUCH AS EXPANDED CLAY

This is a continuation of application Ser. No. 588,053, filed June 18, 1975, which in turn is a continuation-in-part application of U.S. Ser. No. 235,079, filed Mar. 15, 1972, both now abandoned.

The present invention relates to a method of manufacturing porous light ceramic bodies and more particularly to a method of manufacturing porous ceramic products by mixing ceramic starting material, such as clay, with a powderous substance having a large specific surface area and containing silica and metal oxides, and heating the composition while simultaneously forming pores therein. The method enables previously worthless products to be used for a useful purpose and is, moreover, superior to known methods of producing porous light ceramic bodies.

The finely divided particles of material entrained in waste gases emanating from different industrial processes and discharged through chimneys to the surrounding countryside create serious environmental problems. Consequently, it is now generally required that filter devices be provided for the purpose of capturing these particles to the benefit of the environment. Particles originating from processes such as steel and other metal manufacturing processes and collected in electrofilters or the like also create serious environmental problems. Previously, no useful purpose has been found for these waste products. The method of the present invention, however, enables some of these products to be usefully used. Characteristic of these products which may be used in accordance with the present invention and which will hereinafter be referred to as "fly dust" is that firstly they have an extremely small particle size with an enormously large specific surface area, often in excess of 20 m$^2$/g, and secondly they have a high proportion (75-92%) of silica (SiO$_2$) and contain different metal oxides, such as one or more of the oxides MgO, Cr$_2$O$_3$, FeO, Fe$_2$O$_3$, Al$_2$O$_3$, ZnO, Ni$_2$O$_3$, TiO$_2$, CuO, PbO and often also a minor amount of C or S, each small particle having exactly the same composition. By way of example of fly dusts which can be made use of according to this invention can be mentioned:

a. fly dust ("silica fumes") obtained from ferrosilicon manufacturing processes, containing between 75 and 92% SiO$_2$ and varying percentages of MgO, Cr$_2$O$_3$, FeO, together with minor quantities of C and possibly also S. Such dust normally has a specific surface area in excess of 20 m$^2$/g, and is amorphous.

b. fly dust obtained from silicon-chrome manufacturing processes and having a similar composition and properties to the silica fumes above.

c. fly dust obtained as waste from perlite expanding processes and containing about 70-75% SiO$_2$, 12-15% Al$_2$O$_3$, 6-10% alkali oxide, the remainder being various metal oxides.

d. fly dust obtained from crushing quarts, quartzite or other stones (in many countries the extra-fine waste dust of stone-crushing, f. inst. for road constructions has to be collected and is not allowed to be spread into the air).

In addition to these siliceous waste products it is also possible according to this invention to make use of other similar waste products, such as:

e. filter dust obtained from steel manufacturing processes and containing roughly 90% Fe$_2$O$_3$.

f. filter dust obtained from copper manufacturing processes and containing 50–75% ZnO (in so called slag fuming).

The materials (e)–(f) are not so super-fine as materials (a) and (b) and have a specific surface area of the order of 3,000 cm$^2$/g.

It is difficult and relatively expensive to produce such finely divided materials as those envisaged here by grinding methods. The fly dust or filter dust products used in accordance with this invention, however, are available as waste and worthless secondary products.

Thus, it is characteristic of the products which are primarily used in accordance with this invention and herein called "fly dust" that they have a high SiO$_2$ content of at least 75%, are amorphous and have a very high specific area. The term "fly dust" is not intended to include other finely divided products which do not have these properties, such as so called "fly ash" which is dust-like material collected from the stack gases leaving the furnaces of power plants which consume coal. Such "fly ash" generally contains little SiO$_2$, but great amounts of Fe$_2$O$_3$ and CaO as well as carbon. It is not amorphous and its specific area is essentially lower than that of "fly dust". Furthermore, fly ash contains high amounts (more than 20%) of C, which would be too much for producing cellular products, as this would cause a turbulent gas-evolution during heating and by that disturbing a regular pore-structure.

When correctly exploited, the above mentioned characteristic properties of industrial fly dusts afford a number of advantages. The high specific surface area of the fly dust lowers the temperature at which a chemical reaction with other materials, takes place for example such as mineral powders, clay, metal oxides etc. Further, the metal oxides present in each individual particle forms a eutectic, thereby reducing the melting and sintering temperature still further. Thus, such dust particles open new avenues for manufacturing methods to follow and may be contributory to the manufacture of new products.

It is known how to expand clay, clay state and other siliceous materials into porous light weight bodies. This is mostly applicable to pellets commercially available under the trade names Leca, Haydite, Keramsit etc. It has also been proposed to make large blocks or slabs of expanded clay although no practical methods for putting these proposals into effect have been devised. One condition for the success of clay expanding processes is that the starting material is a clay having a well defined composition within a narrow range and determining the ratio of SiO$_2$:Al$_2$O$_3$ to fluxing agents and organic substances, which function as gas forming agents (expansion agents). Numerous tests and three-coordinate diagrams (eg. such as Riley, 1951) provide information on the suitable chemical composition. Different temperature curves have been published to illustrate firing conditions. According to at least one suggestion, the material is subjected to a primary heating step in a reducing atmosphere (mentioned by Hedin-Hedvall-Aggeryd in 1944) and to a secondary heating step in a subsequent oxidizing atmosphere when the gas begins to form, the change in atmospheres being accomplished by moving the material from one kiln to another, or from one part of the kiln to another. Various additives, such as sulphite waste liquor, activators and regulators are said to facilitate expansion. Expandable clay is expanded by heating small predried clay granulates relatively quickly to a temperature of between 1000° and 1200° C.

This temperature of 1000°–1200° C. causes thermal decomposition of organic constituents and at a temperature of 1100°–1200° C. the formation of a sinter skin on the surface which encloses the gases created by thermal decomposition of organic constituents in the clay and those formed by carbonic acid, sulphur dioxide, in addition to those gases formed by the reduction of trivalent to divalent iron oxide. Sintering is the coalescing into a single mass under the influence of heat. If the gases are unable to penetrate the sinter skin, the interior of the clay swells, to cause a more or less uniform porosity. The supply of heat can be effected in a simple manner in the case of small granulates, but is more complicated to accomplish when treating larger granulates. With small clay granulates formed into cylinders or pellets and placed in moulds on top of each other, the heat is able to pass through the spaces located between adjacent pellets. When the pellets fuse together, the gas has already started to develop and the formation of pores to commence in the small granulates.

It is important, however, that clay bodies in general obtain the same foaming sequence, so that the cell structure is uniform throughout the mass. This is difficult to achieve, since the gas forming substances in the actual clay are not so uniformly distributed that each particle has exactly the same composition or contains the same quantity of expanding agent. Consequently, mostly non-uniform pores are formed, which is of no importance when expanding such small granulates as Leca but which cannot be accepted in the case of larger granulates. Moreover, it is not believed that a clay is known which contains all the constituents necessary for an optimal process of foaming. The activators and regulators used hitherto are not sufficiently fine to provide each particle of clay with exactly the same enrichment, even with the most homogeneous and intimate mixtures.

The usual method of making large porous lightweight bodies is to bond together loose expanded Leca type clay particles with cement, gypsum, lime etc. Bonds of this type however are uneven and, moreover, hydraulic bonds do not have the same heat, moisture and frost resistance as a sintered ceramic bonds. Attempts to obtain a sintered ceramic bond have also been made by pressing together in moulds while still hot small granulates taken directly from the rotary furnaces in which they are made. In this case, the boundary surfaces between the individual, interfused small granulate is visible, the pore structure — and therewith the insulation — is irregular and the density is increased as a result of the pressure forces applied.

The aforementioned disadvantages are not found with the method of the present invention.

It has surprisingly been found possible to expand almost all types of known clays — even those which have hitherto been considered unexpandable — by homogeneously mixing therewith a siliceous powder of high specific surface area (above 20 m$^2$/g) and containing metal oxides such as FeO, $Fe_2O_3$, MgO, $Cr_2O_3$, ZnO, $Ni_2O_3$, $Al_2O_3$, $TiO_2$, $MnO_2$, $SnO_2$, etc., (thereby providing a eutectic and lowering the sintering temperature) and preferably also small quantities of C and optionally also S or some other suitable oxidizing agents — for gas development — together with some alkali, i.e. a material having the composition of a fly dust. Obviously, such substances as metal oxides, alkali, oxidising agents as C, SiC, $MnO_2$ etc. can be added separately, although in this case it is more difficult to obtain a uniform distribution of said substances to each small particle. If, on the other hand, these substances are bound to each grain of the powder the reaction takes place simultaneously over the whole mass of particles and is not stronger at some points than at others. Lowering of the sintering temperature means that the development of gas and sintering of the mass take place within a narrow temperature range, which is a prerequisite for uniform porosity. The type of fly dust mixed with the clay varies with the type of clay used. Normally, the major quantity of dust used is taken from that closest at hand (the costs involved are mainly transport costs) while this dust is supplemented with another dust rich in those ingredients lacking in the clay in question. For example, if more iron oxide is needed and fly dust obtained from ferrosilicon manufacturing processes does not satisfy requirements, the requisite percentage of waste rich in $Fe_2O_3$ and obtained from steel manufacturing processes (filter dust) can be combined therewith. If desired for economical reasons the dust can also be supplemented with other available substances such as ash, powdered slag etc. If the clay is poor in alkali, it can be admixed with minor quantities of water glass or alkali metal silicate, caustic soda or the like. In accordance with the present invention, however, the major additive should always be a fly dust having an exceptionally high specific surface area and containing both metal oxides and carbon. The small but evenly distributed amount of carbon prepares a fine cell structure, which then controls the development of gas from other sources, e.g. from the reduction gases ($Fe_2O_3$ to FeO) — which would otherwise form large and more irregular cavities.

By adding such fly dust, clays which are otherwise unexpandable, e.g. clays having a high calcium oxide content, can be rendered suitable for the purpose, while the expandability of suitable clays is improved twofold or more. While previously it has hardly been possible to obtain densities below 0.35 kg/dm$^3$ in respect of burned expanded clay bodies, it is possible when proceeding in accordance with the present invention to produce bodies having a bulk density of roughly 0.2 kg/dm$^3$. The quantity of fly dust added varies with the type of clay used, but lies between 1 and 35% by weight in relation to the clay, preferably 5–20%.

To facilitate the malleability of the unburned clay dough and the development of the gas during the heating step, it can be convenient to add minor quantities of oil such as tall oil or petroleum, sulphite or sulphate waste liquor, dextrin or bitumen etc. to the mix.

As will be readily understood, the method of the claimed invention is not solely applicable to the manufacture of large expanded ceramic light weight bodies, but that the aforementioned additives also improve the pore formation of loose expanded clay granulates of the Leca, Haydite, Keramsit type.

The invention is illustrated below by way of examples.

EXAMPLE 1

100 parts by weight clay were mixed with 10 parts by weight of a fly dust obtained from a ferrosilicon manufacturing process. Admixed therewith were 10 parts by weight of a 20% sulphite waste liquor and sufficient to homogenize the dough. The homogenized dough was then divided into small pieces, which after being dried were either placed in molds or onto a belt with side barriers and heated. The pieces can be introduced into the kiln at room temperature or at temperatures as high as 300°-400° C. or higher. The time taken to reach the top temperature - which varies between 1100° C. and 1200°C. according to the composition of the clay, and even higher with refractory clays — is from 1 to 5 hours, depending on the type of the clay. The pieces are maintained at this temperature, at which expansion takes place as a result of a sinter skin being formed, for roughly thirty minutes, again depending on the type of clay used. Further, according to the composition of the clay and the siliceous fly dust, the amount of silica fumes recited in the example may — if desired — be reduced to 6 parts by weight and supplemented with 3 parts by weight of filter dust obtained from a steel manufacturing process.

EXAMPLE 2

Instead of clay or in partly substitution of clay various wastes, slags or the like can be taken. As clay contains besides $Al_2O_3$ (17-47%) a variable amount of $SiO_2$ (50-70%), alkali (10-20%) and even some organic materials, which are used as oxidising agents for the cell-formation, these oxides or oxidising agents have to be added separately. A suitable composition, is

| | |
|---|---|
| 30 parts by weight | clay |
| 40 " | finely crushed quartz or quartzite, (f. inst. waste from road-construction) |
| 10 " | caustic soda |
| 10 " | alumina-containing ore f. inst. waste from perlite-expansion) |
| 5 " | fly dust (a or b, page 2) |
| 2 " | $MnO_2$ |
| 0,2 " | SiC. |

The composition is treated similar to the procedure outlined in Example 1.

With regard to blocks of expanded clay, one major problem has been to prevent the swollen clay during heating from sticking to the surface supporting same, and hence upwardly open molds have been proposed coated with a special lubricant which, however, is difficult to retain on the side walls of the mold. An improvement can be achieved in this respect if the clay during the burning process is not exposed at the top thereof, but completely wrapped with a sheet of aluminum foil for example, which may optionally be provided with a thin layer of aluminum phosphate. In this way, not only is sticking of the clay to contacting mold surfaces prevented, but a suitable reducing atmosphere for expansion in the lower temperature regions is obtained, owing to the fact that the entry of air is excluded, so that the organic substances in the clay needed for generating as at higher temperatures do not burn away too early. At approximately 600°-700° C., the aluminum foil bursts, exposing the clay to an oxidizing atmosphere, which is favorable in the final stages of the swelling period. This method of procedure obviates the use of complicated atmospheric regulating means in the kiln.

Conventional lubricants or release agents are also difficultly retained on vertical surfaces and burn onto the clay, thereby rendering it necessary to subject the clay to subsequent treatment processes. Moreover, irregularities are formed on the bottom. When using a sheet of foil, however, as suggested above smooth clay surfaces are obtained and neither the bottom or the side walls need by subsequently treated. Enclosure of the clay in the foil also promotes homogenization of the pore structure. In the case of clays subjected to high gas pressure, it may be advantageous to perforate the bottom and top folds of foil. The inner surface of the foil and the center surface of the clay body may also be powdered with soot, coal dust or the like.

The pore structure of the clay body can be varied by admixing unburned organic particles, minor quantities of plastics and resins, e.g. polyacrylate, expanded or unexpanded polystyrene etc.

The porous clay products produced in accordance with the aforegoing have closed cells and afford a remarkable heat insulating means. At a weight by volume of between 0.4 and 0.5 kg/dm$^3$, the mechanical strength of said products is so high (higher than porous concrete) that they can be used as supporting elements in building structures and — in respect of concrete, which cracks at about 250° C. — have the advantage of being more heat resistant at a lower weight.

The method of the present invention can also be used to make sound insulating products. The cells in this case should, of course, communicate with each other, instead of being closed. This means that the mass may be consolidated but not sintered. A consolidated mass is one which has been fired but not to a temperature to create sintering. Sound absorbing partition walls should also have a desired density and should not vibrate when exposed to strong sound waves. By regulating the heating process so that the pores do not close, a communicating system of pores can be obtained. In this case a low temperature gas forming agent is suitably added e.g. a gas which reacts at about 100°-500° C. Such agents include for example aluminum powder (together with minor quantities of lime or gypsum) and hydrogen peroxide, which produces a porous structure at temperatures as low as about 100° C. Thereafter it is only necessary to burn the clay at between 800° and 1100° C. (depending on the type of clay used) in order to consolidate the mass which is to place it in a solid mass without being sintered. The pores by this procedure are open.

The consolidated mass has open pores which communicate with each other and extend throughout the mass.

Open pore structures are prepared either by introducing an agent into the mixture of clay and fly dust which will form gas at a temperature below the sintering temperature of the mixture and heating the mixture to create the gas but not sinter or by utilizing a clay having organic constitutents which will thermally decompose at a temperature below the sintering temperature of the clay and fly dust mixture and heating the mixture to bring about the thermal decomposition without sintering.

Closed pore structures are prepared by rapidly heating the clay and fly dust mixture to its sintering temperature which at the same time is sufficiently high to cause thermal decomposition of the organic constituents. If the temperature is increased to the sintering temperature i.e., 1100° C-1200° C, any pores formed by the generation of hydrogen at lower temperatures will close without changing the actual cell structure. At the same time the gases generated by the gas forming substances in the clay and in the fly dust will form pores in the walls between the pores formed at the low temperature range. In this way, by double pore formation, it is possible to produce extra light insulating material with a weight by volume as low as about 0.2 kg/dm$^3$. "Consolidation" as used herein means heating of the clay composition within such a temperature range that the composition forms a solid mass but is not sintered. Such a mass is highly porous but without any regular or uniform cell structure. "Sintering" means that the composition is heated to a temperature such that the particles of the composition coalesce by partial fusion so that the composition forms a solid mass. The material is heated to the lowest melting temperature of any ingredient, whereby it acts as a binder holding together the unmelted particles.

For clay materials consolidation generally takes place at about 800°–1100° C, depending on the composition of the clay mixture. Sintering normally takes place at temperatures of 1200°–1600° C, also depending on the composition of the clay mixture. The sintering temperature depends mainly on the alkalinity of the clay, in that it is highest with clays of low alkali content, e.g. so called refractory clays and kaolin, while a high alkali content gives a low sintering temperature. Thus, e.g. feldspar (65.0% SiO$_2$, 18.0% Al$_2$O$_3$, 17.0% K$_2$0) and nephelin syenite (54.6% SiO$_2$, 23–26% Al$_2$O$_3$, 16.0% alkali oxide) have sintering temperatures of about 1200° C, albite (68.7% SiO$_2$, 17.5% Al$_2$O$_3$, 11.8% Na$_2$O) has a sintering temperature of about 1400° C and kaolin (39.5% SiO$_2$, 46.6% Al$_2$O$_3$, 0% alkali oxide) has a sintering temperature of about 1500°–1600° C.

Among common ceramic clay products, e.g. earthenware and bricks are consolidated, but not sintered, because they are fired at low temperatures. On the other hand, stoneware and clinker are high fired, non-porous and partly vitrified, i.e. sintered.

If it is desired to produce ceramic light weight bodies of great strength (in particular large bodies, not just small pellets or the like) the non-uniform porosity obtained by consolidation is not sufficient. The pore-forming evolution of gas, which occurs at temperatures of 900°–1200° C. must be controlled so that each cell has a sintered surface which provides sufficient chemical and mechanical resistance. The sintered surface has the advantage that it provides a dense skin which entraps the gases and permits a regular pore formation. However, since the sintering temperature is normally high it is possible that not only the surface of each particle becomes liquid, but also the inner portions thereof may become liquid, which would destroy the cell structure. By proceeding in accordance with the present invention, however, it is possible, due to the fact that the fly dust is amorphous and has a high specific surface area, to lower the sintering temperature and avoid melting of the inner portions. Amorphous substances react more rapidly with the other ingredients of the composition, forming a eutectic which lowers the sintering temperature, e.g. to a range of 1100°–1200° C, so that also high-melting substances begin to sinter.

It has been discovered that fly dust combines at temperatures above 1000° C with metal oxides having very high melting points, such as Al$_2$O$_3$, ZrO$_3$ etc. It is remarkable that two difficultly melted substances react with each other at considerably lower temperatures and that highly refractory products are obtained in a simple manner. The creation of pores does not take place automatically. It is, however, possible to admix small organic particles such as beads of expanded polystyrene which are burned away during the heating process and which leave behind a regular cell structure. In certain instances the addition of fly dust may in this case be as high as 50%.

EXAMPLE 3

70 parts by weight of Al$_2$O$_3$, 30 parts by weight of fly dust taken from a ferrosilicon manufacturing process, 2.5 parts by weight of expanded polystyrene and 100 parts by weight water were mixed together and heated to slightly above 1000° C. The result was a highly refractory porous block having a bulk density of roughly 0.45 kg/dm$^3$. The material is suitable for insulating furnaces etc.

Hard road covering materials of the type known commercially as Synopal can also be produced by means of the present invention. Hitherto such materials have been made from a mixture of sand, chalk (marl) and dolomite, with special after-treatment. Such coatings make asphalt roads brighter and more wear resistant. The method of the present invention enables such coatings to be made more readily and less expensively.

The following products can thus be produced by means of the present invention:

1. Cellular ceramic building elements (with closed cells) which are both bearing and insulating elements. Such elements have a low bulk density (0.35–0.50 kg/dm$^3$ equivalent to 21.8–31.2 lb/ft$^3$), are refractory (do not crack when subjected to heat as does concrete), and are moisture and frost resistant. The elements are therefore superior to and cheaper than lightweight concrete and gypsum plates.

2. Improved granulates of the Leca, Haydite and Keramsit type.

3. Sound insulating elements for partition walls, ceilings etc. (with open cells).

4. Extra light insulating material with closed pores and a bulk density between 0.2 and 0.3 kg/dm$^3$ (equivalent to 12.5 and 18.7 lb/ft$^3$), and 5. Highly refractory products for furnace structures, etc., which products are, at the same time, insulating.

What is claimed is:

1. A method of manufacturing porous ceramic products consisting essentially of
   mixing ceramic clay with
   1 to 35%, based on the weight of said clay, of an amorphous fly dust having a specific surface area of at least 20 m$^2$/g and consisting essentially of 75–92% silica, metal oxides selected from the group consisting of MgO, Cr$_2$O$_3$, FeO, Fe$_2$O$_3$, Al$_2$O$_3$, ZnO, Ni$_2$O$_3$, TiO$_2$, CuO, PbO, MnO$_2$ and SnO$_2$, and a minor amount of carbon, and
   heating the resulting composition to at least 800° C to convert said composition into a porous ceramic material.

2. The method according to claim 1 wherein said composition is heated at a temperature within the range of 1100° to 1200° C and above the sintering temperature of said composition so that principally only closed pores are formed.

3. The method according to claim 1, including admixing to said clay substances which form gases at temperatures of about 100° to 500° C and
   heating said composition at a temperature within the range of 800° to 1100° C and below the sintering temperature of said composition at which open pores are formed therein.

* * * * *